No. 664,257. Patented Dec. 18, 1900.
T. GAUNT.
PROCESS OF MAKING STARCH AND CATTLE FOOD.
(Application filed Nov. 19, 1895.)
(No Model.) 2 Sheets—Sheet 1.
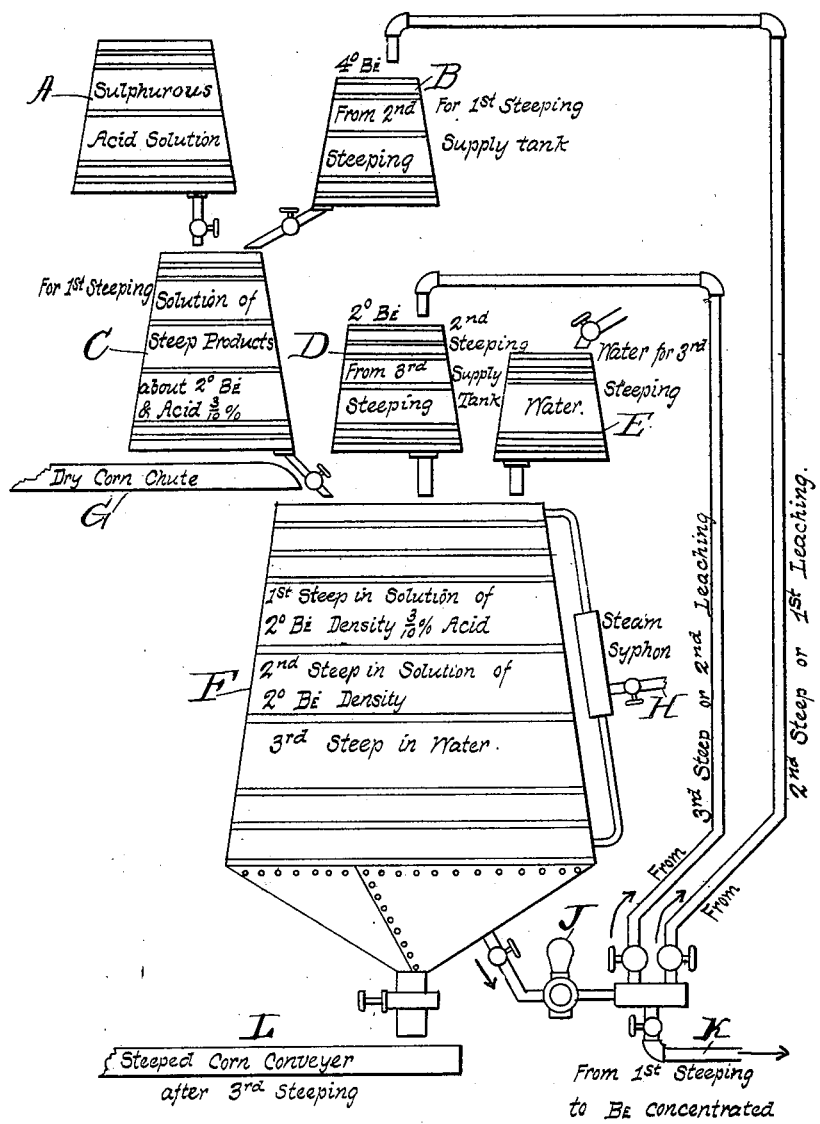
Witnesses:
G. M. Bunney
F. H. Davis
Inventor.
Thomas Gaunt
by Harold B. Binney
Attorney.

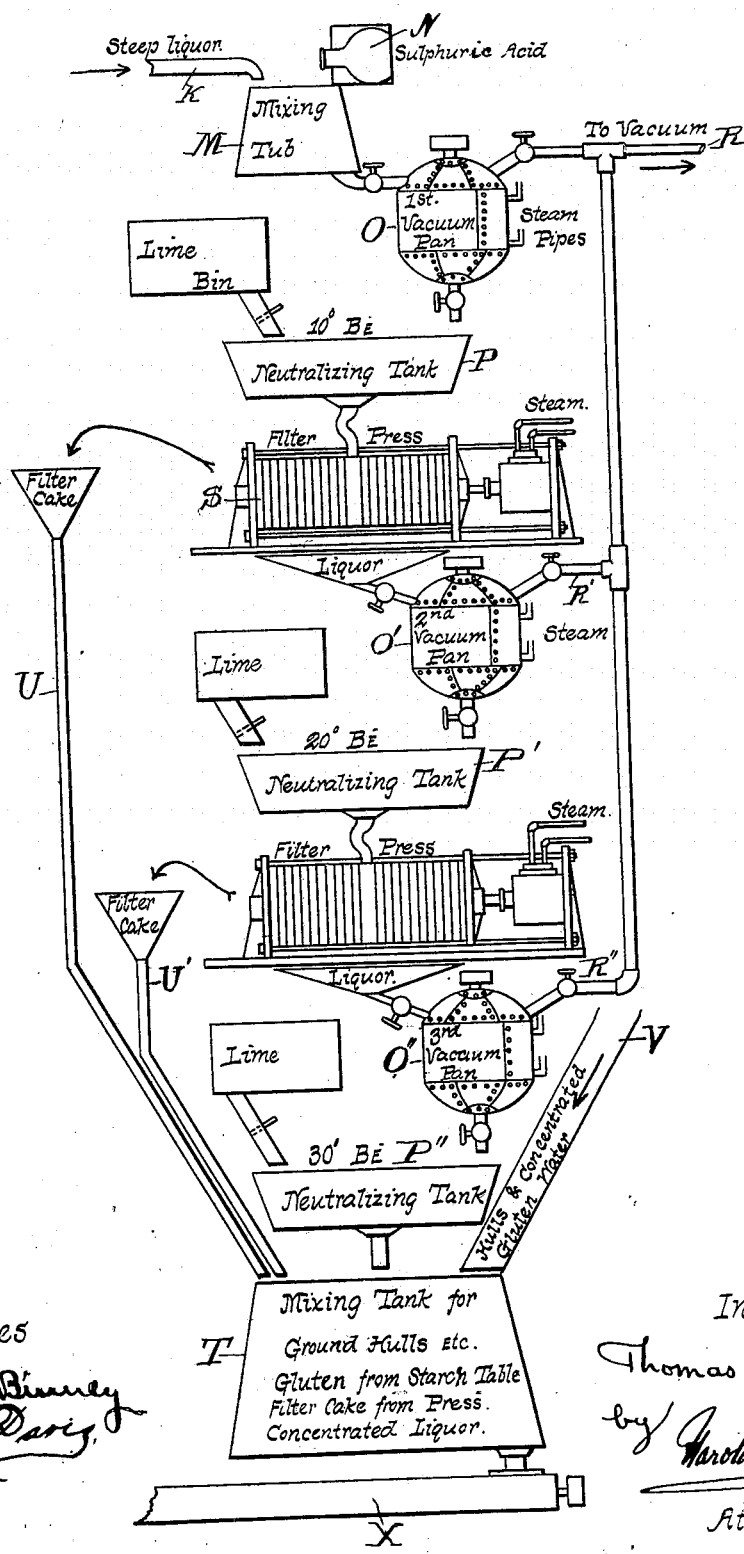

UNITED STATES PATENT OFFICE.

THOMAS GAUNT, OF PEORIA, ILLINOIS, ASSIGNOR OF TWO-THIRDS TO WILLIAM HAMLIN AND HARRY HAMLIN, OF BUFFALO, NEW YORK.

PROCESS OF MAKING STARCH AND CATTLE-FOOD.

SPECIFICATION forming part of Letters Patent No. 664,257, dated December 18, 1900.

Application filed November 19, 1895. Serial No. 569,386. (No specimens.)

*To all whom it may concern:*

Be it known that I, THOMAS GAUNT, of Peoria, Illinois, (formerly of Buffalo, New York,) have invented certain new and useful Improvements in Treating Corn and Grain and a new and useful Feed Produced Thereby, of which the following is a description, reference being had to the accompanying diagram, illustrating the process.

The improved process is especially applicable to the treatment of corn for the separation of starch, glucose, and other derivatives of starch and of feed for cattle. In treating corn for this purpose one very common and successful process is to first steep the corn for about thirty hours in water or other steep medium at a temperature of approximately 130° and thereafter grind the steeped corn with water, separate the hulls from the starch particles, and then separate the starch by settling from the gluten-water upon starch-tables. The gluten may then be mixed with the ground hulls to form feed. In the process of steeping almost all the soluble substances, including sugar, some gluten, and all the aromatic principles of the corn, are washed from the corn. By the improved process which forms the subject-matter of the present application these substances are all recovered and mixed with the feed, giving it certain qualities which render it a great deal more nutritious than the usual feed from which these substances have been lost. The improved feed is richer and gives better results when fed to live stock, being more nutritious. A quart of the improved feed will replace a larger quantity of other feeds. Owing to its aromatic and agreeable qualities the cattle eat it eagerly and thrive upon it. By the use of this feed a larger quantity and improved quality of milk and other dairy products are obtainable.

Briefly stated, the improved process is as follows: The steep-water after being drawn from the corn is treated with sulfuric acid, and after being partially concentrated in a vacuum-pan is then passed through a filter-press, by which cakes of insoluble gluten are obtained. The filter liquor is then further concentrated and again filtered, extracting more gluten. The liquor from the second filters is then further concentrated to the desired amount and is mixed with the gluten cakes produced by the filters, and finally mixed with the feed as it comes from the starch-separating process. The gluten-water from the starch-tables is also concentrated and added to the feed, and the feed is then thoroughly stirred and dried ready for use. The improved feed is therefore composed of a mixture of four separate products—to wit., the ground hulls and feed after the starch and gluten have been washed from it, the gluten which runs from the starch-tables, the cakes of soluble gluten filtered from the steep-water, and the concentrated liquor which passes through the filters.

In the accompanying drawing I have indicated, diagrammatically, my complete process in its preferred form, the two sheets of drawing constituting but a single diagram or figure broken at the point K, where the steep liquor passes from the steep to the mixing-tub.

I will now proceed to describe the various steps and subprocesses necessary to the successful production of my improved feed.

After the starch has been deposited from the gluten-water upon the starch-tables the gluten-water is readily concentrated by settling in deep settlers. The heavy gluten-water flows out at the bottom of the settler and the waste water is drawn off from above. Preferably the concentrated gluten-water as obtained from one set of settlers is run through a second set to obtain further concentration and is then ready to be run into the feed-tank or otherwise mixed with the ground hulls.

The ground hulls and adherent matter, which constitute the main body of the improved feed, are obtained in the well-known manner by grinding the steeped corn and then washing the starch and gluten from the hulls and adherent matter upon screens. The ground hulls and adherent material pass from the ends of the shaker-screens and after repeated washing to free the starch are conveyed to a feed-tank. Preferably in treating the corn the germs are separated from the hulls and do not, therefore, form a constituent of the finished feed; but so far as the present process is concerned they may or may not be so separated.

The main obstacle to prior attempts which have been made to obtain the valuable substances which are known to be contained in the water in which the corn has been steeped is found in the extraction of the substances from the steep-water. The price at which it is necessary to sell the feed precludes the evaporation of great quantities of water. Moreover, after the corn has been steeped it still contains in its moist condition a large quantity of the steep-water, which is ultimately washed away with the gluten-water from the starch-tables and escapes with the waste from the gluten-settlers. I have to a large extent recovered this absorbed steep-water by a process which I term "leaching," and by the same process I am enabled to obtain a greater concentration of the steep-water as it is finally taken from the steeps and treated for the extraction of the materials which it contains. This leaching process is indicated diagrammatically so far as it is possible to illustrate it diagrammatically. In Sheet 1 of the accompanying drawing, for the sake of illustration, I have assumed that the capacity of the steep is sufficient to contain a quantity of corn which will be covered by eight thousand gallons of the liquid without causing the corn to rise above the surface of the liquid as it swells and absorbs it. I have found that the corn after being steeped for about thirty hours in a solution of sulfurous acid of about three-tenths per cent. strength and of the quantity indicated absorbs about one-half of the solution, and therefore in drawing off the liquor produced by steeping only about one-half of the soluble materials in the corn can be drawn off. By the method which I term "leaching" the corn is steeped two or three times in steep-water of greater purity at each steep, so that a large amount of the liquor of the first steeping, absorbed and held by the corn, is washed from it. If the water as drawn off after each steep be collected and concentrated, a great amount of evaporation is necessary; but by my process the same water which is used for the last steeping, and is therefore comparatively dilute, is used on other corn which has not been washed or leached so much. It consequently collects an additional amount of the solubles held in the moistened corn and is drawn out at a greater density than that at which it was introduced. This steep-water may in turn be used, together with a certain quantity of sulfurous-acid water, as the original steep solution for fresh corn, and when drawn from this corn after one steeping it has a greatly-increased density, owing to its having taken up a large quantity of the soluble substances.

In the diagrammatic illustration of the leaching process each quantity of corn is steeped three successive times, each successive time with water containing less of the soluble substances than that used in the previous steeping.

Let it be first supposed that the process is being begun for the first time and that therefore there are only at hand the dry corn, water, and sulfurous acid. Sulfurous acid and water in proportions to give three-tenths per cent. strength is run onto the corn and the corn steeped in eight thousand gallons of this acid water for thirty hours. The steep liquor thereby produced is drawn off; but only four thousand gallons, or about one-half, can be drawn off, the rest being absorbed by the corn. The steep liquor so drawn off is found to contain soluble gluten, sugar, and other soluble corn substances and is of about 4° Baumé density. This liquor is taken to the concentrators and treated as will be hereinafter described. The steeped corn is then steeped a second time in four thousand gallons of water for about five hours or until it has mixed freely with the four thousand gallons of steep-water absorbed in the moist corn. When drawn off, this liquor from the second steeping is found to be of about half the strength—say 2° Baumé—and therefore the amount still absorbed in the corn is of approximately the same strength. This liquor is saved in a tank which I will term "first-steep-supply tank," and when mixed with an equal amount of sulfurous-acid water at sixtenths per cent. strength constitutes the supply of steep liquor for the first steeping. The corn, which has now been steeped twice, as described, is further leached or washed for five hours by four thousand gallons more water. After this third steeping the steep liquor is found to be of the strength of 1° Baumé, and this steep liquor is saved and run to a tank which I will term the "second-steep-supply tank," from which the steep liquor is drawn for the second steeping of each successive quantity of corn treated. The second quantity of corn treated receives its first and second supplies of steep-water no longer free from soluble substances, but containing a certain amount of them, and therefore somewhat less of the soluble substances can be extracted from the corn by the use of such steep-water. Eventually as the process goes on the cycle becomes established at such a strength that it goes on continuously, the corn being steeped first with water containing a certain amount of the soluble substances, then with water containing somewhat less, and finally with pure water. It is clear also that the first steep-water, containing already a considerable amount of the soluble substances, will be drawn out after the first steeping at a considerably greater strength than would otherwise be the case and that therefore less evaporation is necessary to concentrate it to the desired amount. It is also clear that since the corn is finally washed in pure water a comparatively small amount of the soluble substances is left in the corn, for whatever is obtained in the liquor as it goes to the concentrators is of course extracted and removed from the corn.

The accompanying diagram illustrates as well as I can illustrate it graphically the continuous process after the cycle has been established and the permanent strength of the successive steeping solutions reached.

It must not be understood that the densities or the quantities stated are strictly accurate, for they are only intended to be illustrative and approximate.

In the diagram, A is intended to illustrate a tank for acid solution; B, a tank for solution from second steeping; C, tank for solution for first steeping; D, tank for solution from third steeping; E, a water-supply tank; F, the steep-tank; G, the dry-corn chute; H, steam-heating connection; J, pump delivering from tank F; K, delivery-pipe to concentrating system; L, a conveyer for steeped corn; M, a mixing-tank; N, a source of acid-supply; O, a vacuum-pan; P, a neutralizing-tank; S, a filter-press; R, exhaust from vacuum-pans; U, chute for filter-cake; T, a mixing-tank; V, a chute delivering ground hulls with gluten-water; X, conveyer delivering to the driers, and the letters marked prime, second, &c., indicate second and third sets of apparatus similar to that similarly lettered.

The dry corn is first steeped for thirty hours in eight thousand gallons of steep solution which is preferably of three-tenths per cent. strength of sulfurous acid and of a density of about 2° Baumé, soluble gluten, sugar, and other substances dissolved from previous steepings. These eight thousand gallons of 2° Baumé are made up by adding four thousand gallons at 4° Baumé from the first-steep-supply tank and four thousand gallons of sulfurous acid at six-tenths per cent. strength. After steeping for thirty hours four thousand gallons are drawn off and found to be of density approximately 6° Baumé, it having added 4° to its strength by dissolving the soluble substances contained in the corn. The corn therefore still contains and has absorbed four thousand gallons; but the solution so held in the corn is of a strength somewhat in excess of the strength of the quantity drawn off, or at least 6° Baumé. This corn is then steeped for five hours in four thousand gallons steep liquor of 2° Baumé density, which is received from the second-steep-supply tank. This liquor, circulating through the corn, mingles with the four thousand gallons absorbed in the corn and becomes of a density approximately the mean of the two—i. e., 4° Baumé. This liquor is drawn off and forms, as will be seen from the diagram, the source of supply for the first-steep-supply tank. The corn is then steeped for a third time in four thousand gallons of water that is free from any of the dissolved substances, and this mingling with the four thousand gallons at 4° Baumé contained and held by absorption in the corn acquires the mean of the two strengths, or approximately 2° Baumé. When drawn out, this steep liquor at 2° Baumé density forms the source of supply for the second-steep-supply tank. After this a fresh supply of dry corn may be introduced and treated as before.

The steep-corn, after the three successive steepings which constitute my leaching process, is ready to be ground and treated for the extraction of starch, gluten, feed, and other substances.

In order that the proper temperature and a thorough circulation may be kept up in the process of steeping, I employ a steam-siphon, which continually circulates the steep liquor through the corn and facilitates the more thorough mingling of the liquor held by absorption in the moist corn and the steep liquor of lesser density in which the corn is immersed. By this method of leaching or successive steepings and by using the steep-water as it is drawn off over and over with increasing strength I am enabled to extract about seventy-five per cent. of all the solubles in the grain and at the same time run the liquor from the first steeping to the concentrators at a density greatly in excess of what would be obtainable by a single steeping in pure acid solution. The steep-water is delivered at 6° Baumé as against 4° Baumé by the old process, so that to obtain one thousand gallons of concentrated liquor at 30° Baumé would necessitate in the one case an evaporation of but four thousand gallons of water out of five thousand, instead of six thousand five hundred gallons out of seven thousand five hundred by the single-steep process, effecting a great saving in cost. At the same time about fifty per cent. more of the aromatic substances is obtainable.

From the steeping and leaching process the steep liquor at somewhat less than 6° Baumé is delivered into a receiving-tank, where it is mixed with sulfuric acid in the proportions of thirty pounds sulfuric acid to four thousand gallons of steep liquor.

Heretofore it has not, so far as I am aware, been commercially feasible to concentrate the steep liquor, because in the process of concentrating in a vacuum-pan a voluminous precipitate of albuminous substances is produced, which forms a thick coating on the heating-coils and on the interior of the pan. Another objection is that the albuminous substances prevent the proper evolution and escape of the steam, so that the whole mass boils up and tends to go over into the condenser. I have discovered, however, that by acidulating the liquor with a non-volatile mineral acid, such as sulfuric acid, the albuminous substances are held longer in solution. Moreover, the sulfuric acid acting upon the sulfites, due to the action of the sulfurous acid used in steeping the corn, probably transposes them into sulfates and sulfurous-acid gas is given off. This evolution of gas in the mass of the liquor causes the boiling to be far freer than would otherwise be the case.

After the sulfuric acid has been added, thirty pounds to four thousand gallons of steep liquor, as stated, giving a decidedly acid liquor, the liquor is run to a vacuum-pan and concentrated to about 10° density. Up to this point the albuminous substances give no trouble in the vacuum-pan. At 10° Baumé the liquor is partially neutralized by adding lime-milk. The lime unites with the free sulfuric acid, forming gypsum and water. The neutralization of the acid, together with the mechanical effect of the precipitated gypsum, causes the deposit of a heavy precipitate of albuminoids, which is readily extracted by means of filter-presses, giving a cake of soluble gluten and other substances and freeing the steep liquor that passes through the filter-presses from a large amount of albuminous substances. The liquor is then run into a second vacuum-pan and concentrated to about 20° Baumé. To facilitate the circulation of the liquid, mechanical circulators are employed, and these, together with the filtering of the liquid, enable me to concentrate to 20° Baumé without difficulty. When the density of 20° Baumé has been reached, the neutralizing and filtering processes are repeated, giving a second precipitate in the form of a cake from the filter containing a large portion of the remaining gluten and other albuminous substances. The liquor passing from the second filter-presses is again concentrated in a vacuum-pan with mechanical circulation to about 30° to 35° Baumé, and it is then finally and completely neutralized by adding more lime. In this final neutralization the remaining sulfuric acid unites with the lime to form gypsum, and the strongly-acid phosphates, with, perhaps, small quantities of phosphoric acid, are neutralized by the formation of phosphate of lime and water. After the final concentration and neutralization the liquor contains the sugar and more soluble substances still in solution and the gypsum and other insoluble and slightly-soluble substances in suspension. To this dense liquor the filter-cake containing the precipitates extracted by the successive filtering processes is added and broken and mixed by suitable mechanical stirring appliances. In this concentrated form, partly solution and partly precipitates, the products of the steeping process are obtained in a condition suitable for mixing with the feed. The feed already mixed with the concentrated gluten-water from the starch-tables receives the admixture of the steep-water products, and is then thoroughly stirred to mix its various constituents. After mixing the feed is dried and finally delivered to the curing-room ready for the market.

While I have described the details of the preferred form of my process in all its essential steps, it must not be understood that such details are subject to no variation whatever. It is clear also that the leaching process may be omitted; but in such case very much less of the soluble substances will be extracted from the corn. So, also, the steeping and leaching process may be employed independently of the process to which the steep liquor is afterward subjected; but it is clear that by the steeping and leaching process as combined in the complete process greater amount of the saccharine, aromatic, and soluble substances will be saved and eventually mixed with the feed, giving a pleasanter fragrance and flavor and increasing its desirability as a feed for stock. So, also, it is possible that other chemicals may be found to effect the same purposes as the sulfuric acid and lime used in the concentrating process and therefore constitute equivalents to the substances described and claimed. It will be seen that the sulfuric acid is completely neutralized eventually and to some extent at least sulfate of lime or other mineral salt is formed. The presence of this mineral salt to such a slight extent is, I believe, an advantage. I am not yet certain how far other mineral salts may be used in place of the sulfate of lime, and will not therefore attempt to enumerate any equivalents.

What I claim and desire to secure by these Letters Patent of the United States, together with all such variations as may be made by mere mechanical skill and with only the limitations as expressed or by law implied in view of the related art, is as follows:

In the process of simultaneously obtaining starch and cattle-food from cereals, the extraction of the soluble constituents from the cereals by subjecting the cereals to successive steepings in liquids of decreasing density, utilizing the liquor from the second and succeeding steepings respectively, for the first and succeeding steepings of other quantities of said cereals with the addition of fresh liquid at the first steeping thereof, and thereby both increasing the amount of solubles extracted and the density of the liquor from the first steeping, substantially as set forth.

In testimony whereof I have hereunto set my hand, at Peoria, Illinois, this 12th day of November, A. D. 1895.

THOMAS GAUNT.

In presence of—
THOMAS J. HARTY,
CARRIE M. GILL.